(12) United States Patent
Konishi et al.

(10) Patent No.: US 7,101,656 B2
(45) Date of Patent: Sep. 5, 2006

(54) OPTICAL DISK MASTER, OPTICAL DISK SUBSTRATE STAMPER, PROCESS FOR PRODUCTION THEREOF, AND MAGNETO-OPTICAL RECORDING MEDIUM

(75) Inventors: Masahito Konishi, Kanagawa (JP); Keiji Nishikiori, Kyoto (JP); Koujiro Tanaka, Osaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 10/107,190

(22) Filed: Mar. 28, 2002

(65) Prior Publication Data

US 2002/0182546 A1    Dec. 5, 2002

(30) Foreign Application Priority Data

Mar. 30, 2001    (JP) .............................. 2001/101377

(51) Int. Cl.
*G03C 5/00*    (2006.01)
*G03B 7/24*    (2006.01)
(52) U.S. Cl. .................. 430/321; 430/270.11; 430/330
(58) Field of Classification Search ................ 430/321, 430/270.11, 330, 328; 216/24, 62, 97, 107
See application file for complete search history.

(56) References Cited

U.S. PATENT DOCUMENTS

| 4,321,317 A | * | 3/1982 | MacIver ........................ 430/5 |
| 4,797,316 A | * | 1/1989 | Hecq et al. ................. 428/167 |
| 6,027,825 A |   | 2/2000 | Shiratori et al. ..... 428/694 ML |

FOREIGN PATENT DOCUMENTS

| JP | 6-290496 | | 10/1994 |
| JP | 7-161080 | | 6/1995 |
| JP | 9-161321 | | 6/1997 |
| JP | 11-336748 | | 12/1999 |
| JP | 2001243665 | * | 9/2001 |

* cited by examiner

*Primary Examiner*—Thorl Chea
(74) *Attorney, Agent, or Firm*—Fitzpatrick, Cella, Harper & Scinto

(57) ABSTRACT

A process for producing an optical disk master, comprises the steps of forming a photoresist layer on a glass master, cutting the photoresist layer by projecting light beam onto the glass master having the photoresist layer thereon to expose the photoresist layer to light, developing the photoresist layer after the cutting step to form a hollow portion corresponding to the light-exposed portion, and carrying out an ion treatment by projecting ions onto the developed photoresist layer to decrease the thickness of the photoresist layer at the developed hollow portion to reach the prescribed depth by the ion-treatment.

8 Claims, 14 Drawing Sheets

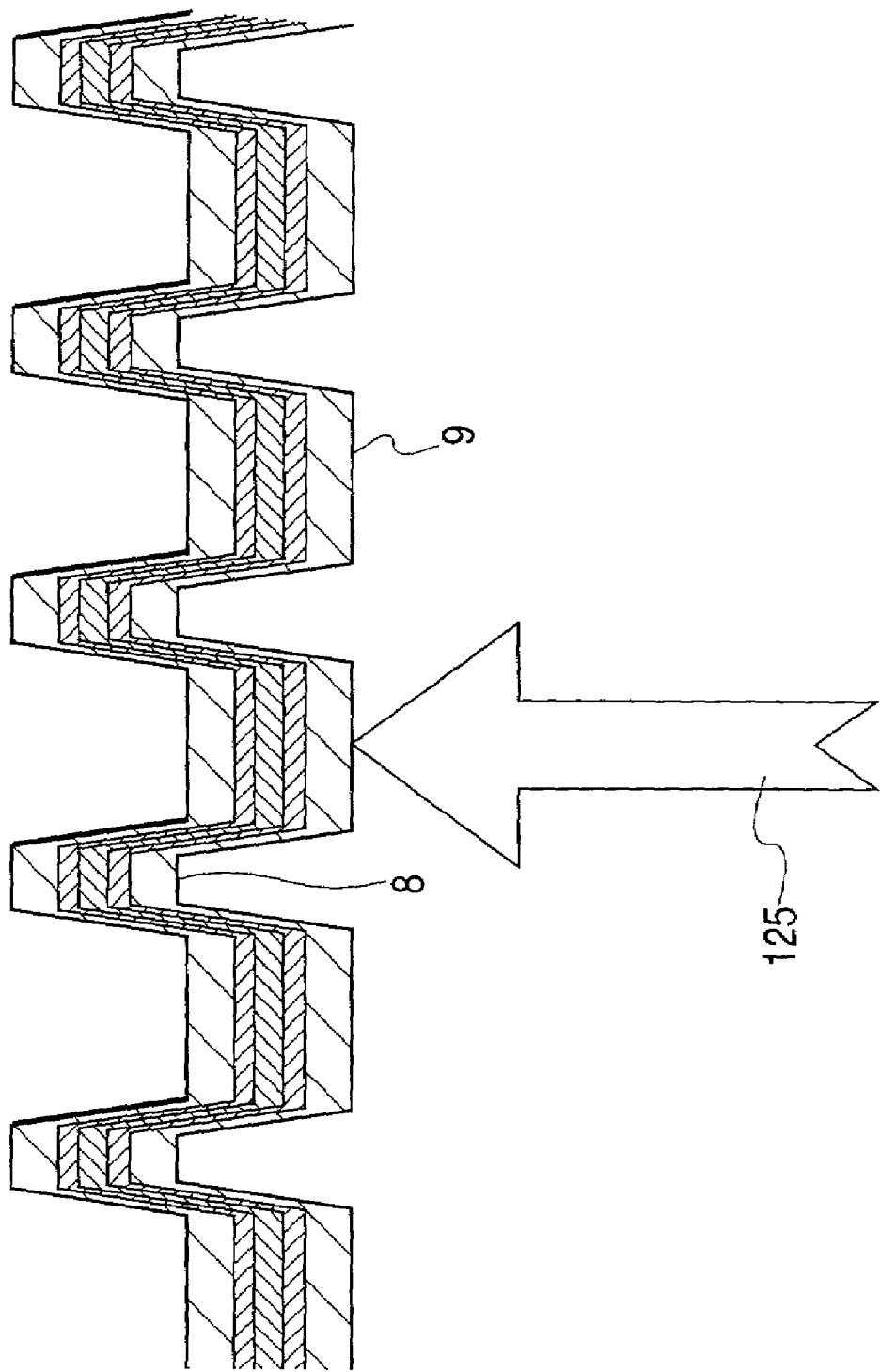

OPTICAL DISK MASTER, OPTICAL DISK SUBSTRATE STAMPER, PROCESS FOR PRODUCTION THEREOF, AND MAGNETO-OPTICAL RECORDING MEDIUM

BACKGROUND OF THE INVENTION

1. Field of the Invention

The present invention relates to a process for producing a glass master and a stamper for production of an optical disk, particularly of a high-density recording optical disk. This process is especially effective for producing a domain wall displacement type of magneto-optical medium.

2. Related Background Art

A conventional process for producing a stamper for optical disks is explained by reference to FIGS. 1A to 1G.

In this process, as shown in FIG. 1A, positive type photoresist 2 is applied by spin-coating onto master glass 1 which has been polished and has been spin-coated as necessary with a primer like a silane-coupling agent. The photoresist-coated master is prebaked in a clean oven or a like apparatus. Then as shown in FIG. 1B, predetermined regions of glass master substrate is exposed to light by a light beam modulated in accordance with recording signals by means of a light exposure system (cutting machine) employing an argon ion laser or the like as the light source. In the drawings, the numeral 3 indicates a light beam of the cutting machine, the numeral 4 indicates an exposed region, and the numeral 5 indicates an unexposed region. Generally, the photoresists are classified into negative type photoresists for utilizing the exposed region and positive type photoresists for utilizing unexposed region: the two types of the photoresists are selectively used to meet the objects of use. In the process explained, in the next step, as shown in FIG. 1C, the light-exposed glass master substrate is washed with a developing solution composed of an inorganic alkali and ultrapure diluting water to remove the light-exposed region, washed with pure water, dried by spin-drying, and post-baked to obtain an optical disk master. The photoresist-removed region forms a groove 9, and the remaining photoresist region forms a land 8.

In the step of FIG. 1D, the surface of the optical disk master is coated with electroconductive film 6 such as a nickel film by sputtering. In the step of FIG. 1E, nickel is electroformed on the electroconductive nickel film. The numeral 15 indicates a resulting electroformed nickel layer. The back face of the electroformed nickel layer is polished. Then in the step shown in FIG. 1F, a metal stamper is peeled from the optical disk master. Thereby, a stamper 7 is completed as shown in FIG. 1G.

In recent years, a process is disclosed which produces an optical disk substrate stamper by anisotropic etching to obtain a deep-groove stamper for forming grooves having a nearly rectangular cross-section. Japanese Patent Application Laid-Open No. 7-161080, for example, discloses a process for producing a stamper for optical disk substrates by reactive ion etching (RIE). This process for production and working of the stamper for a land-groove recording substrate by the reactive ion etching is explained by reference to FIGS. 2A to 2I.

In this process, as shown in FIG. 2A, positive type photoresist 2 is applied by spin-coating onto synthetic quartz master 10 which has been polished, washed sufficiently, and spin-coated with a primer as necessary. The photoresist-coated master is prebaked in a clean oven or a like apparatus. Then as shown in FIG. 2B, a predetermined region of the master is exposed to light by a light beam 3 modulated in correspondence with recording signals by a light exposure system (cutting machine) employing an argon ion laser or the like as the light source. In the next step, as shown in FIG. 2C, the light-exposed master is developed by spinning with a developing solution containing an inorganic alkali to remove exposed region 4 of the photoresist. The master is washed by pure water shower, dried by spinning. The unexposed portion 5 is post-baked in a clean oven.

In the next step as shown in FIG. 2D, the master is placed in a chamber of a reactive ion etching apparatus. The chamber is evacuated to a vacuum degree of $1 \times 10^{-4}$ Pa. Therein $CHF_3$ or a like gas in introduced, and reactive ion etching is conducted to obtain glass master 13.

Then as shown in FIG. 2E, the remaining resist is peeled off from glass master 13 by immersing the glass master into a peeling solution composed of concentrated sulfuric acid and aqueous hydrogen peroxide to obtain an optical disk master. In the drawing, the numeral 8 indicates a land, and the numeral 9 indicates a groove. Next, as shown in FIG. 7F, the glass master 13 is washed, and on the surface thereof an electroconductive Ni film 6 is formed by sputtering to impart electroconductivity. Further, as shown in FIG. 2G, a Ni layer is electroformed thereon. The numeral 15 indicates the electroformed Ni layer. The electroformed layer surface is polished, and the electroformed Ni layer 15 is peeled from glass master 13 as shown in FIG. 2H. Through the above steps, stamper 7 is completed (FIG. 2I).

Other processes are disclosed for producing and working a stamper for a land-groove recording substrate, in which a thin film such as an $SiO_2$ thin film is formed on a master glass made of conventional glass produced from soda lime, not expensive quartz glass, as the glass master by reactive ion etching (RIE). Japanese Patent Application Laid-Open No. 11-336748, for example, discloses a process for producing and working a stamper for optical disk substrate, in which plural thin films are formed in lamination on a master glass, a photoresist is applied thereon, the photoresist is exposed to light and is developed, and reactive ion etching is conducted.

Explanation is made on a process for producing and working a stamper by a reactive ion etching of an inorganic oxide thin film such as $SiO_2$ film formed on a master glass, by reference to FIGS. 3A to 3L.

Master glass 1 is polished and washed well. On the master glass 1, $Al_2O_3$ film 21 is formed as a first thin film layer as shown in FIG. 3A.

Thereon, $SiO_2$ film 22 is formed in a thickness of about 140 nm as a second thin film layer by sputtering as shown in FIG. 3B.

The surface of the $SiO_2$ film 22, which may be spin-coated with a primer if necessary, is spin-coated with positive photoresist 2 as shown in FIG. 3C. Then a prescribed region of the photoresist is exposed to light beam 3 modulated in accordance with recording signals by a light exposure apparatus (cutting machine) employing an argon ion laser or the like as the light source as shown in FIG. 3D. The photoresist is developed with the aforementioned inorganic alkali developing solution by spinning to remove exposed portion 4, as shown in FIG. 3E. The developed photoresist is washed with pure water, dried by spinning, and post-baked in a clean oven, as the post-treatment. The master is placed in a chamber of a reactive ion etching apparatus. The chamber is evacuated to a vacuum degree of $1 \times 10^{-4}$ Pa; therein $CHF_3$ or a like gas in introduced; and reactive ion etching 14 is conducted as shown in FIG. 3F. The etching is conducted to reach a prescribed groove depth (corresponding to the thickness of the second thin SiO₂ film 22) to obtain glass master 13. From the glass master, the remaining resist is peeled by oxygen plasma ashing as shown in FIG. 3G. The glass master 13 is immersed into a developing stock solution to remove first thin film 21 of Al₂O₃ in the exposed region by wet etching to obtain optical disk master 13 as shown in FIG. 3H. The portion indicated by the numeral 8 becomes a land portion, and the portion indicated by the numeral 9 becomes a groove. On the surface of the glass master 13, after washing, electroconductive Ni film 6 is formed by sputtering for electroconductivity as shown in FIG. 3I. Thereon a nickel layer is electroformed as shown in FIG. 3J. The numeral 15 indicates a electroformed Ni layer. Then electroformed Ni layer 15 is peeled off from glass maser 13 as shown in FIG. 3K.

Stamper 7 is completed (FIG. 3L) through the steps shown above. In some application fields, the stripped metal stamper can be utilized, after insulation-film treatment of the surface, as a stamper family of mother-stamper/sun-stamper (not shown in the drawing). Thereafter, the stamper is worked by press-punching or a like working into a desired shape to complete a metal stamper. By use of this metal stamper, optical disk substrates having signal-recording hollows are replicated by injection molding, a 2P process, or the like molding method. On the optical disk substrate, a reflection film of a metal like aluminum or a magnetic film is formed to obtain an optical disk.

The stamper prepared by the above process has disadvantage that the faces of land portion 8, especially unexposed portion 5, and faces of the inclined side wall of the hollows become rough as shown in FIG. 4. This surface roughening can occur in the cutting step of FIG. 1B, in the sputtering step of FIG. 1D, or in the step of resist removal of the stamper. The surface roughening can be caused in the sputtering step by particle size and uniformity of the sputtering film, in the step of the resist removal by the resist-removing chemical. However, the cutting operation is the major cause of the surface roughening.

The light beam modulated by recording information for light exposure has a Gauss distribution of the intensity. Therefore, the light-exposed region is not precisely coincide with the intended region. This leakage of the light, and reverse face reflection can cause light exposure outside the intended region. The unintended light-exposed region can also be developed to cause fine surface roughness.

In a metal stamper prepared by reactive ion etching also, the side wall surfaces of the grooves are confirmed to be rough considerably although the surface roughness is nearly the same level between the land portions and groove portions. This can be caused by fine residues of the photoresist remaining on the interface between the photoresist and master glass after the light beam exposure and development.

This roughening problem becomes more serious at the narrower track pitch and the larger projection formed, and is important for increasing the density of the optical disk.

Various attempt are made for increasing the recording density of the optical disk. Japanese Patent Application Laid-Open No. 6-290496 discloses increase of the recording density of magneto-optical recording by domain wall displacement detection system. The domain wall displacement system achieves reproduction resolution exceeding the limit by light spot diameter in the line (track) direction by utilizing magnetic wall displacement caused by reading-out light spot. In magneto-optical record reproduction with such a substrate having the roughness of the side wall portion, the reflected light quantity varies by scattering of the reproduction light spot by the side wall roughness to increase substrate noise in the reproduced information signals to lower the S/N ratio of the signals. In particular, when the domain wall displacement detection type of magneto-optical recording medium is combined with such a deep-grooved substrate, the wrinkling roughness of tens of nanometers formed at the shoulder of the land portions prevents smooth displacement of the domain walls, in addition to the drop of S/N ratio of the signal, disadvantageously.

To solve the above problem, a known method is a baking treatment to improve the surface smoothness. In this method, the photoresist is exposed to a light beam, and a pattern is formed by development in a conventional production process, and a hard baking treatment is conducted in which the photoresist layer is heat-treated near the melting point thereof to improve the surface smoothness of the grooves.

In this improved production process, most of the side wall portion becomes gently sloping, and the roughness is decreased. However, the roughness is observed to be still remaining at the interface between the flat portion of the groove and the side wall by scanning electron microscopy.

SUMMARY OF THE INVENTION

The present invention had been made to solve the above problem of prior art technology.

The present invention intends to provide a process for producing a stamper for an optical disk suitable for high-density recording by removing fine roughness caused by light exposure in a cutting step and by a developing treatment.

According to the present invention, the problem is solved by the process of producing an optical disk master and producing a stamper of an optical disk substrate. The process comprises a step of forming a photoresist layer on a glass master; a step of cutting the photoresist layer by projecting light beam onto the glass master having the photoresist layer thereon to expose the photoresist layer to light; a step of developing the photoresist layer after the cutting step to form a hollow portion corresponding to the light-exposed portion; and a step of ion treatment by projecting ions onto the developed photoresist layer to decrease the thickness of the photoresist layer at the developed hollow portion to reach the prescribed depth by the ion-treatment.

According to an aspect of the present invention, there is provided a process for producing an optical disk master, comprising the steps of: forming a photoresist layer on a glass master; cutting the photoresist layer by projecting light beam onto the glass master having the photoresist layer thereon to expose the photoresist layer to light; developing the photoresist layer after the cutting step to form a hollow portion corresponding to the light-exposed portion; and carrying out an ion treatment by projecting ions onto the developed photoresist layer to decrease the thickness of the photoresist layer at the developed hollow portion to reach the prescribed depth by the ion-treatment. The optical disk master may correspond to a groove-recording optical disk. The glass master may be made of quartz glass, and the process further may comprise the step of forming a fine pattern on the glass master by projecting ions onto the developed photoresist layer, and etching the quartz glass by reactive ion etching with a CHF type gas by utilizing the remaining photoresist as a mask.

In the process of the present invention, the glass master may be comprised of a glass plate coated with a thin inorganic oxide film, and the process further may comprise the step of forming a fine pattern on the glass master by projecting ions onto the developed photoresist layer and etching the thin inorganic oxide film by reactive ion etching with a CHF type gas by utilizing the remaining photoresist as a mask. The thin inorganic oxide film formed on the glass master may be comprised of at least one layer made of a material different from the glass plate. The thin inorganic oxide film may have a lamination layer structure comprised of an $Al_2O_3$ film and an $SiO_2$ film, and the $SiO_2$ film is etched by utilizing the $Al_2O_3$ as an etching stopper layer.

In the above process of the present invention, the photoresist layer may be etched by at least 5 nm in the ion treatment. Further, information recorded by cutting in the cutting step may include sample servo pits.

The above process of the present invention further may comprise the step of heat-treating the photoresist layer at a temperature near the melting point thereof, before or after the ion treatment step.

According to another aspect of the present invention, there is provided an optical disk master, produced by the process set forth in the above.

According to still another aspect of the present invention, there is provided a process for producing a stamper for an optical disk substrate, comprising the steps of: forming an electroconductive film on the surface of the optical disk master; plating a metal on the electroconductive film; and peeling the plated metal from the master. The process may comprise further the step of etching the metal surface of the separated stamper to form a groove in a prescribed shape. There is provided a stamper for preparing an optical disk substrate, produced by the process, according to further aspect of the present invention.

According to further aspect of the present invention, there is provided provided a magneto-optical recording medium, comprising: an optical disk substrate produced by use of the stamper for an optical disk, a first magnetic layer, a second magnetic layer, and a third magnetic layer formed in lamination, wherein the first magnetic layer is comprised of a perpendicular-magnetized film which has a lower domain wall coercivity than the third magnetic at or around an ambient temperature; the second magnetic layer is comprised of a magnetic layer having a lower Curie temperature than the first magnetic layer and the third magnetic layer; and the third magnetic layer is comprised of a perpendicular-magnetized film. Therein a groove may be formed in a depth ranging from 20 nm to 300 nm on the magneto-optical disk substrate. Alternatively, the groove may be formed in a depth of $\lambda/3n$, $2\lambda/3n$, or $5\lambda/6$ on the magneto-optical disk substrate, where $\lambda$ denotes the wavelength of the magneto-optical disk reproducing beam, and n denotes the refractive index of the magneto-optical disk substrate. The depth of the groove formed on the optical disk substrate may be larger than the total of the thicknesses of the first magnetic layer, the second magnetic layer, and the third magnetic layer.

In the above magneto-optical recording medium, adjacent tracks for signal recording may be isolated magnetically from each other. Further, lands and grooves may be both utilized for signal recording. Alternatively, grooves only may be utilized for signal recording in the medium.

BRIEF DESCRIPTION OF THE DRAWINGS

FIG. 16 is a schematic view of a groove-recording optical disk.

DETAILED DESCRIPTION OF THE PREFERRED EMBODIMENTS

A process for producing an optical disk master of the present invention is described below in detail by reference to drawings.

First Embodiment

Figure 1A:
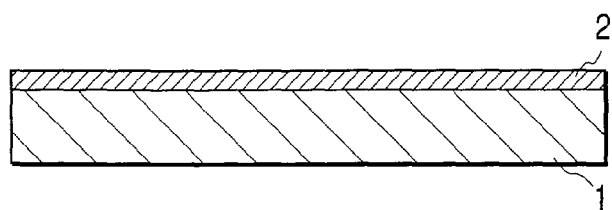
FIGS. 1A, 1B, 1C, 1D, 1E, 1F, and 1G show a flow chart of a conventional process for producing a stamper for optical disk substrate.
Figure 1B:
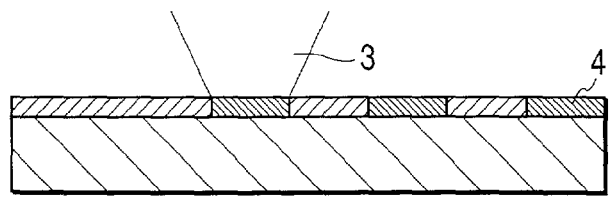
Figure 1C:
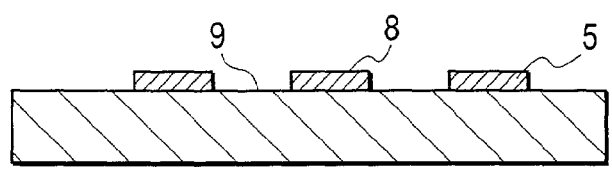
Figure 1D:
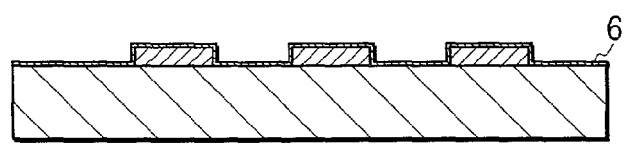
Figure 1E:
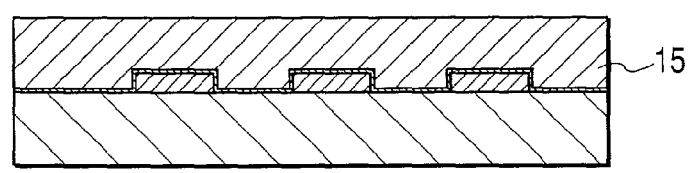
Figure 1F:
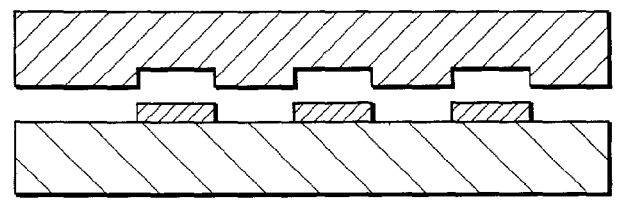
Figure 1G:
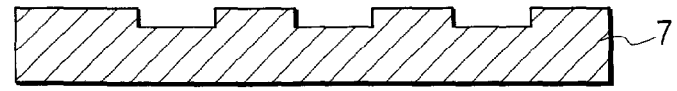
Figure 2A:
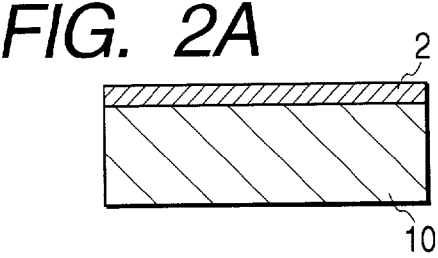
FIGS. 2A, 2B, 2C, 2D, 2E, 2F, 2G, 2H, and 2I show a flow chart of a conventional process for producing a stamper for an optical disk substrate according to a reactive ion etching system.
Figure 2B:
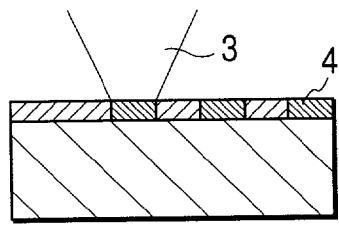
Figure 2C:
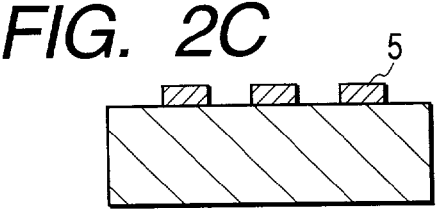
Figure 2D:
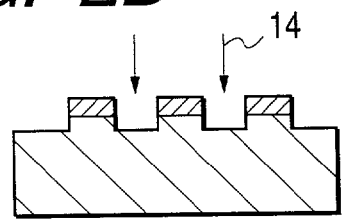
Figure 2E:
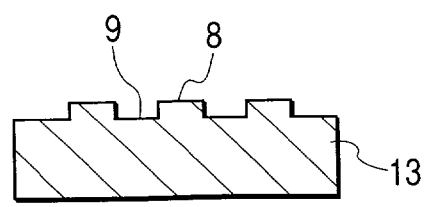
Figure 2F:
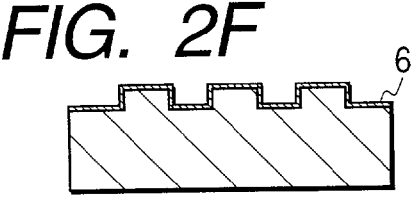
Figure 2G:
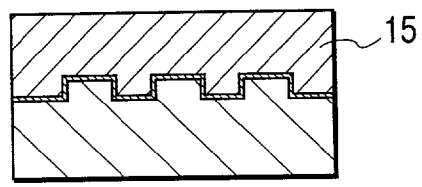
Figure 2H:
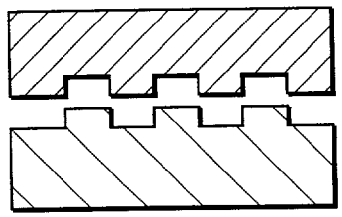
Figure 2I:
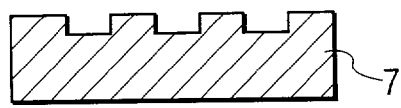
Figure 3A:
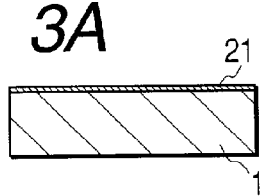
FIGS. 3A, 3B, 3C, 3D, 3E, 3F, 3G, 3H, 3I, 3J, 3K, and 3L show a flow chart of a conventional process for producing a stamper for an optical disk substrate according to a reactive ion etching system employing a thin film on a master glass.
Figure 3B:
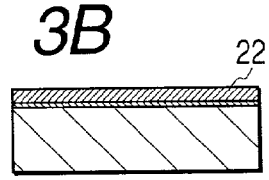
Figure 3C:
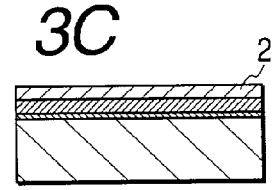
Figure 3D:
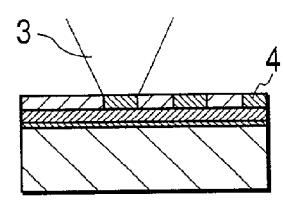
Figure 3E:
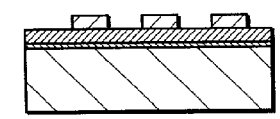
Figure 3F:
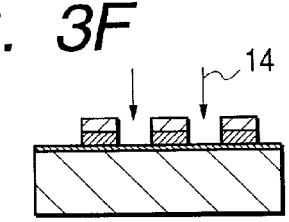
Figure 3G:
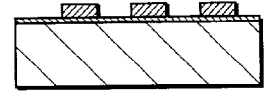
Figure 3H:
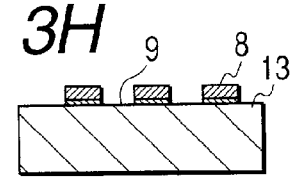
Figure 3I:
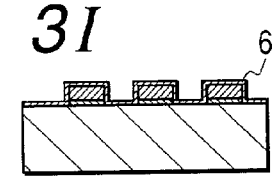
Figure 3J:
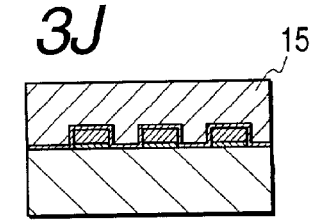
Figure 3K:
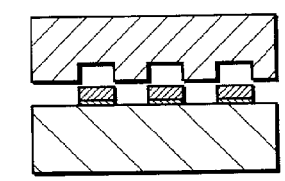
Figure 3L:
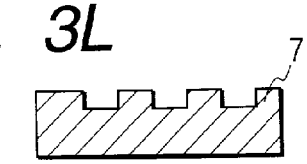
Figure 4:
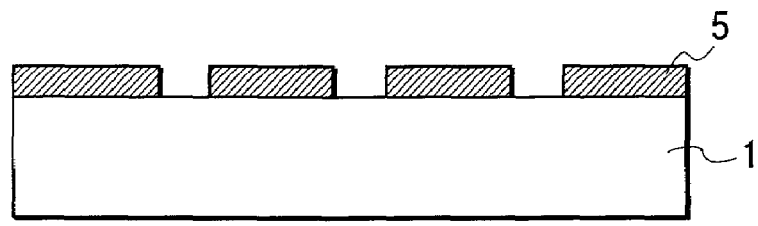
FIG. 4 is a cross-sectional view of an optical disk master in a production process of optical disk master according to conventional method.
Figure 5:
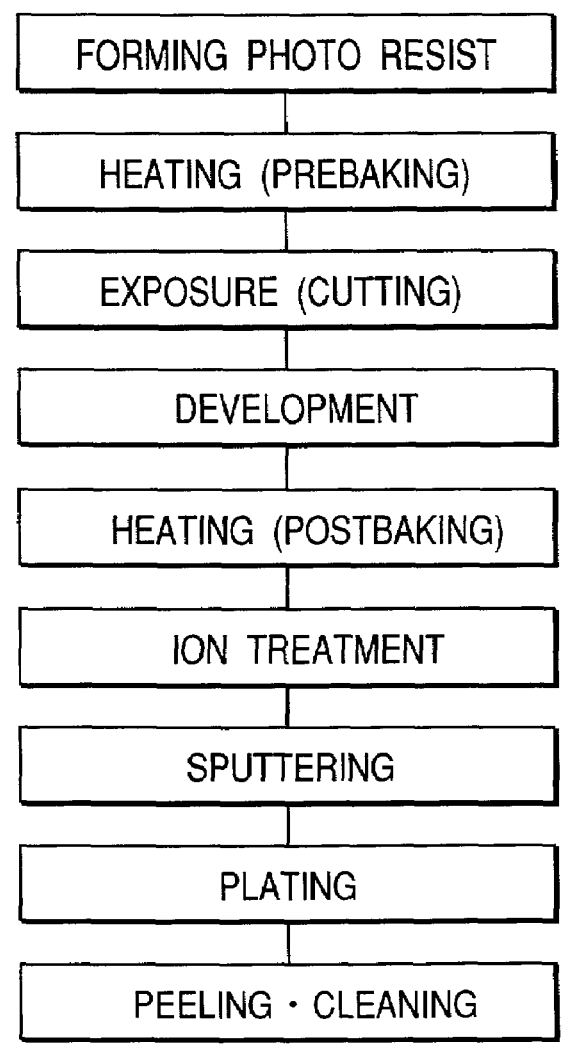
FIG. 5 is a flow chart for production of an optical disk master employed in an embodiment of the present invention.

FIG. 5 shows the steps of the production process in a first embodiment of the present invention.

Firstly, in the photoresist layer formation step, a positive photoresist layer is formed by spin coating on a glass master. The thickness of the photoresist layer ranges, for example, from about 10 nm to about 300 nm to correspond to the depth of the hollow of the optical disk. Then the photoresist layer is heat-treated at about 90° C. for drying.

Next, the photoresist layer is subjected to a cutting step in which the glass master having the photoresist layer is exposed to a laser beam modulated in accordance with information to be recorded. The exposed glass master is developed by an alkali type developing solution or the like to form hollows. After the development, the photoresist is post-baked, and the photoresist layer having the hollow portions in accordance with the recording signals is subjected to an ion treatment (plasma ashing) with oxygen ions or ozone, or the both thereof. Then an electroconductive film is formed thereon by sputtering. Thereafter, plating, peeling, and washing are conducted to produce a stamper.

The ion treatment is conducted, for example, in an etching apparatus by introducing oxygen. This ion treatment decreases the thickness of the photoresist layer rapidly.

Figure 6:
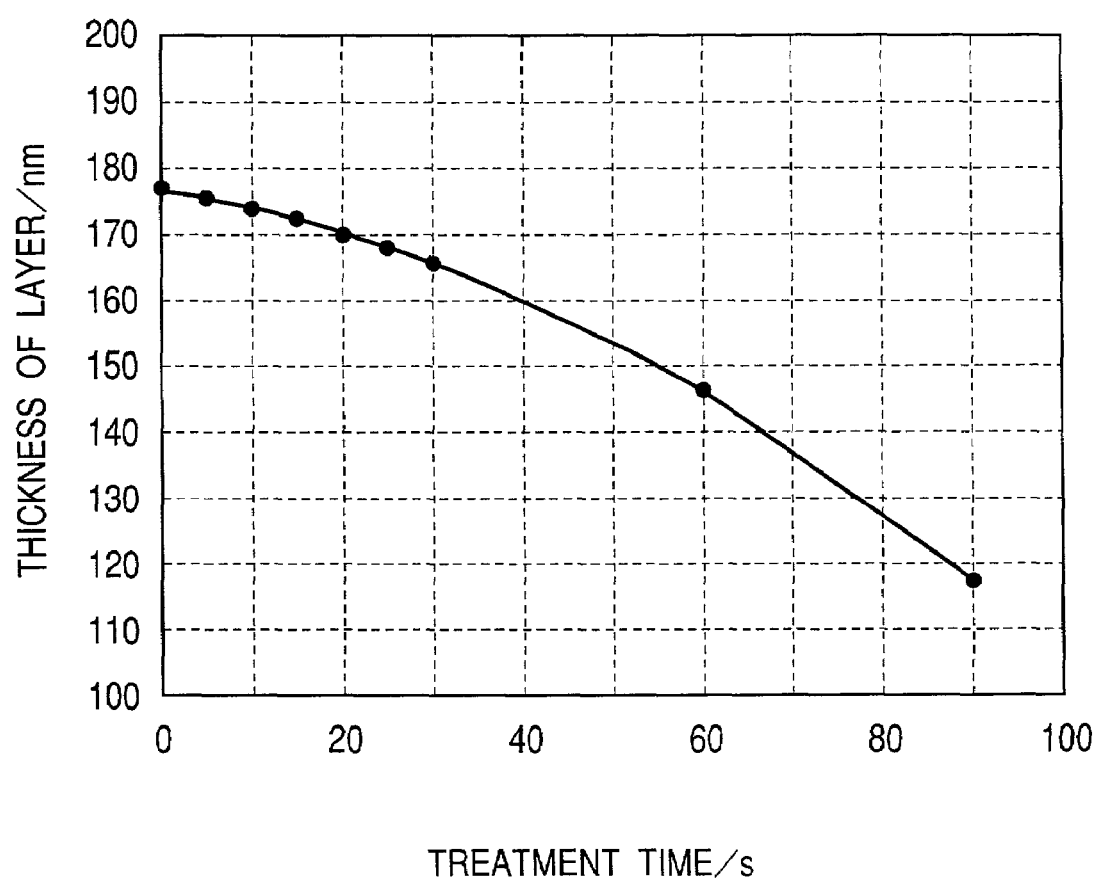
FIG. 6 shows dependence of the photoresist layer thickness on the treatment time in the ion-treatment step in an embodiment of the present invention.

FIG. 6 shows dependence of the photoresist layer thickness on the ion treatment time. In FIG. 6, the ordinate denotes a thickness of the photoresist layer, and the abscissa denotes the treatment time. The thickness of the photoresist layer decreased by about 10 nm in 20 seconds, and by about 30 nm in 60 seconds.

In this treatment, the fine roughness formed in the development step on the bottom surface and slant face of the hollow disappear with removal of the photoresist layer. Therefore, the optical disk can be easily producible and precisely in a shape corresponding to the lands and grooves, by which noises regarding the substrate can be decreased.

In the ion treatment for removal of the resist for obtaining the prescribed depth of the hollow, the resist layer thickness decrease should be taken into account with the intended hollow depth. In the example of FIG. 6, the resist layer is formed in a thickness of about 175 nm, and thereafter the thickness is decreased by about 30 nm by the ion treatment for 60 seconds to obtain the intended hollow. The resist layer thickness can be adjusted for the intended hollow depth and the ion treatment time. In this treatment, it is not necessarily to decrease the thickness but may be to employ another ion treatment time enabling the roughness to be decreased.

The ion treatment step is found to be effective also in decreasing the surface roughness of the glass master at the bottom of the hollow. For example, in this embodiment, the used master glass had a surface roughness (Ra) of 0.5 nm, and after 60 seconds of the ion treatment, the bottom of the hollow of the resulting optical disk master (namely, the glass face) is found to have a surface roughness (Ra) of 0.32 nm. The ion treatment is considered to polish the master glass surface. This effect is especially effective in decreasing the substrate noise of the groove-recording optical disk employing only the grooves for recording track (e.g., the disk shown in FIG. 16).

The production process of the present invention is effective for the stamper for sample servo substrate, since the ion treatment decreases the fine roughness at or around the pits to obtain a suitable result at the substrate having pits and to improve remarkably the signal quality of servo pits in a sample servo system for obtaining tracking signals from pits.

Second Embodiment

Figure 7:
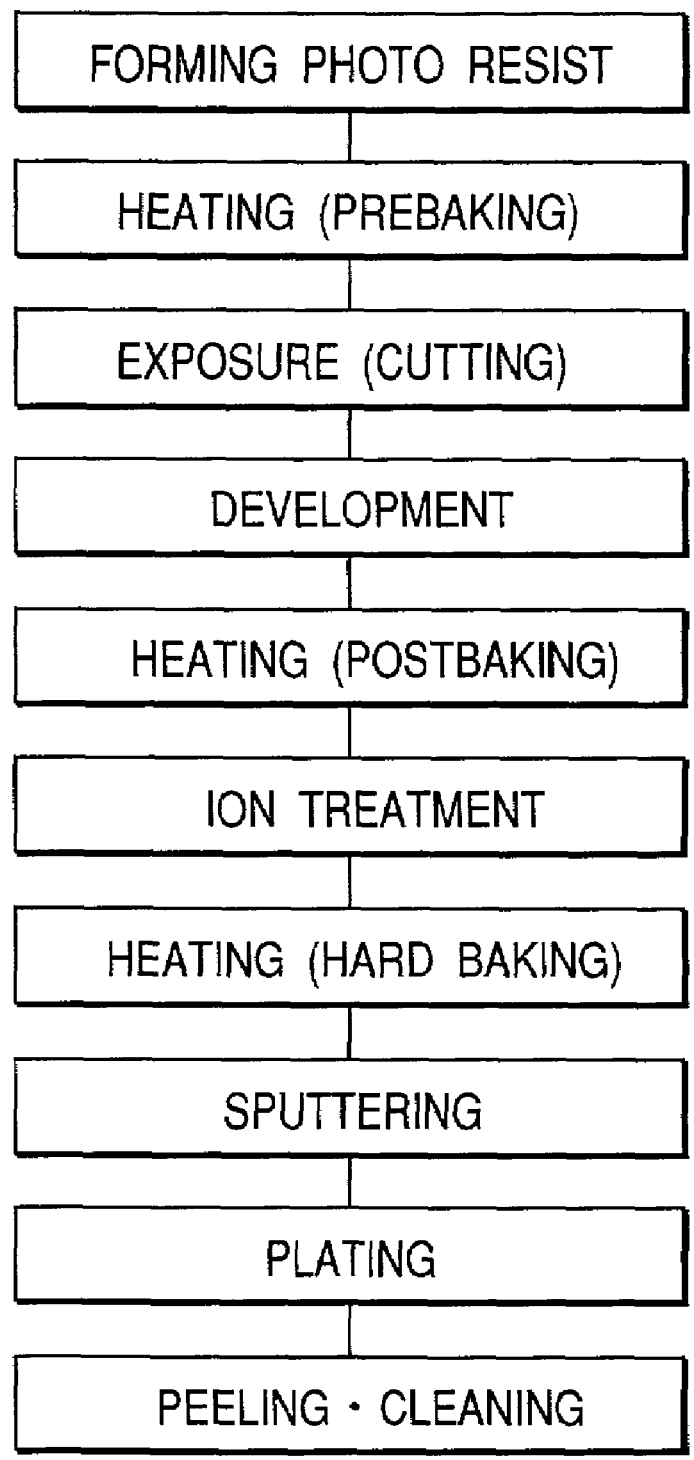
FIG. 7 is a flow chart for production of an optical disk master employed in an embodiment of the present invention.

FIG. 7 shows the steps in the production process in a second embodiment of the present invention.

In the photoresist layer formation step, a positive photoresist layer is formed by spin coating on a glass master. The thickness of the photoresist layer ranges, for example, from about 10 nm to about 300 nm to correspond to the depth of the hollow of the optical disk. Then the photoresist layer is heat-treated (prebaked) at about 90° C. for drying.

Next, the photoresist layer is subjected to a cutting step in which the glass master having the photoresist layer is exposed to a laser beam modulated in accordance with information to be recorded. The exposed glass master is developed by an alkali type developing solution or the like to form hollows. After the development, the photoresist is post-baked, and the photoresist layer having the hollow portions in accordance with the recording signal is subjected to an ion treatment with oxygen ions or ozone, or the both thereof. Then the photoresist layer is heat-treated (hard-baking) at a temperature near the melting point thereof, and thereon an electroconductive film is formed by sputtering. Thereafter plating, peeling, and washing are conducted to produce a stamper.

In this Second Embodiment, after the ion treatment of the master having the resist film pattern, the photoresist layer is heat-treated at a temperature near the melting point. Thereby the surface or slant face of the hollow is made flowable to remove fine irregularity to decrease the roughness.

This treatment decreases the roughness caused in the light exposure step as well as the roughness caused in the ion treatment.

Figure 8:
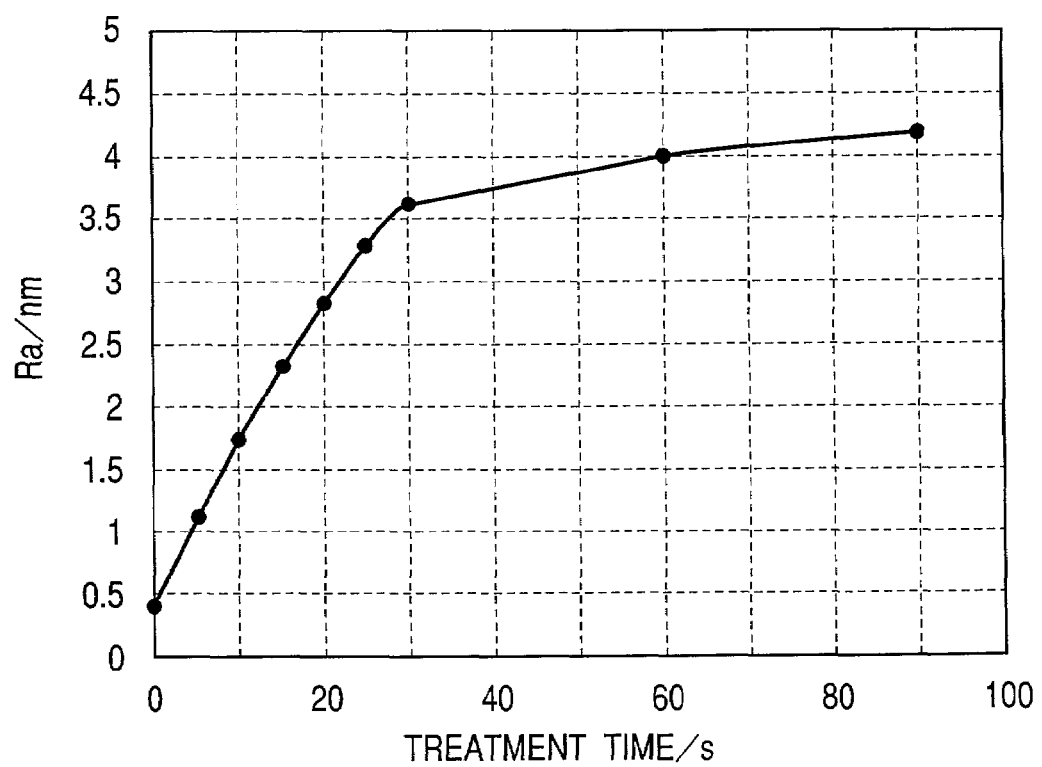
FIG. 8 shows dependence of the average surface roughness Ra on the treatment time in the ion-treatment step in an embodiment of the present invention.

FIG. 8 shows the dependency of the surface roughness Ra of the photoresist surface on the ion treatment time. In FIG. 8, the ordinate denotes the average surface roughness Ra, and the abscissa denotes the ion treatment time. The average surface roughness increases linearly and rapidly with time for about 30 seconds, and then increases gradually. This is caused by nonuniform removal of the resist by collision of the ions against the resist surface.

In the present invention, the roughness of the photoresist layer caused by the ion treatment is decreased by the heat treatment at a temperature near the melting point thereof. The heat treatment makes flowable the surface of the hollow portion of the photoresist layer, enabling decrease of the roughness. Thus the roughness caused by the light exposure can satisfactorily be removed by a long time of the ion treatment.

The melting point of the photoresist layer depends on the kind of the material, usually ranging from about 100° C. to about 160° C. Therefore, the heat treatment is conducted near that temperature range. In this embodiment, even after the ion treatment for 60 seconds, the heat treatment of the photoresist layer at 150° C. in a convection oven for a time of 10 to 30 minutes can reduce the Ra to the initial roughness of about 0.4 nm.

Table 1 shows the change of the average surface roughness Ra of photoresist A having a melting point of 160° C. as a function of the time of heating at 150° C. A convection oven is employed for the heating similarly as in FIG. 6. The Ra decreases with lapse of the heating time, to 1 nm or less in 20 minutes. Usually, the Ra of the stamper for optical disks should be not more than 1 nm to prevent noise generation. Therefore, in this embodiment, the Ra of not more than 1 nm is taken as the acceptable Ra level. With this photoresist, the heating time of about 20 minutes is necessary.

TABLE 1

|  | Heating time (sec) | Average surface roughness Ra (nm) |
| --- | --- | --- |
| Photoresist A | 0 | 3.63 |
| (Melting point: 160° C.) | 10 | 2.42 |
| Heat treatment | 20 | 0.64 |
| at 150° C. | 30 | 0.53 |
|  | 50 | 0.42 |
|  | 60 | 0.42 |

Table 2 shows the change of the Ra of Photoresist A with elevation of the heating temperature at the heating time fixed to 30 minutes. The Ra comes to decrease rapidly at the heating temperature 130° C., being lower than 1 nm at 140° C.

TABLE 2

| | Heating temperature (° C.) | Average surface roughness Ra (nm) |
|---|---|---|
| Photoresist A | 100 | 3.63 |
| (Melting point: 160° C.) | 110 | 3.63 |
| Heat treatment | 120 | 2.65 |
| for 30 minutes | 130 | 1.45 |
| | 140 | 0.67 |
| | 150 | 0.53 |

Table 3 shows the change of the average surface roughness Ra of photoresist B having a melting point of 150° C. as a function of the time of heating at 140° C. The Ra decreases with the heating time, to be less than 1 nm in 20 minutes or longer with Photoresist B also.

TABLE 3

| | Heating time (sec) | Average surface roughness Ra (nm) |
|---|---|---|
| Photoresist B | 0 | 3.63 |
| (Melting point: 150° C.) | 10 | 2.02 |
| Heat treatment | 20 | 0.45 |
| at 140° C. | 30 | 0.43 |
| | 50 | 0.42 |
| | 60 | 0.42 |

Table 4 shows the change of the Ra of Photoresist B with elevation of the heating temperature at the heating time fixed to 30 minutes. The Ra comes to be lower than 1 nm at a temperature higher than 120° C.

TABLE 4

| | Heating temperature (° C.) | Average surface roughness Ra (nm) |
|---|---|---|
| Photoresist B | 100 | 3.63 |
| (Melting point: 150° C.) | 110 | 2.67 |
| Heat treatment | 120 | 0.98 |
| for 30 minutes | 130 | 0.65 |
| | 140 | 0.42 |
| | 150 | 0.42 |

From the results of Tables 1 to 4, the heating treatment is conducted preferably near the melting point of the photoresist, more preferably at a temperature lower by 30° C. than the melting point. The required heating time depends on the heating temperature, so that the heating time is selected based on the heating temperature.

In this embodiment, the heat-treatment is conducted in an oven, but is not limited thereto. The heating may be conducted with a hot plate, IR heater, or the like. In the heating, the environmental temperature may be higher than the melting point, provided that the temperature of the photoresist to be heated is lower than the melting point thereof.

Further, in the production process of the present invention, since the ion treatment may be conducted for a longer time, the fine roughness around the pits can be adjusted more effectively. The production process of the present invention improves remarkably the signal quality of servo pits in a sample servo system for obtaining tracking signals from pits, and is suitable for the stamper for sample servo substrate.

Third Embodiment

In this embodiment, the stamper produced in the above First Embodiment is etched by argon ions, oxygen ions, or the like to remove the fine roughness remaining on the surface or slant face of the hollow after the ion treatment step.

As shown in FIG. 8, in the preceding ion treatment step, the surface roughness increases with lapse of the ion treatment time, remarkably and linearly for about 30 seconds from the start, and gradually thereafter.

In this embodiment, the stamper surface roughness which has been transferred from the master roughness caused by the ion treatment is decreased by etching of the stamper.

By etching by argon ions, the surface roughness Ra of 3.6 nm of the stamper can be decreased to 0.4 nm. By use of oxygen ions, or $CF_4$ ions in place of the argon ions, the Ra can be decreased to 0.4 nm.

In this embodiment, the etching is conducted with an ion etching apparatus, but similar results can be obtained with other etching methods such as plasma etching.

The etching treatment decreases the surface roughness, and simultaneously changes the shape of the protruding portion. A long time of etching makes the protrusion portion unsharp. This unsharpness improves the releasability of the stamper in molding of optical disks with this stamper. The improvement of releasability results from the unsharp edge of the protruding portion which decreases the adhesiveness between the stamper and the resin to facilitate separation of the resin from the stamper. However, depending on the etching conditions, the intended shape of a substrate may not be obtained.

In this embodiment, the ion etching is conducted by means of an ion etching apparatus by introducing Ar ions, $CF_4$, or $O_2$ by application of high-frequency powder of 50 to 300 W for a time ranging from 5 seconds to 20 minutes. The change of the shape of the protruding portion occurs at the power application of at least 50 W for 10 minutes. With the power of 300 W, the shape is changed greatly in several minutes.

In the process of the present invention, the remaining roughness component after the ion treatment can be removed to adjust the fine roughness at or around the pits more completely. Therefore, the production process of the present invention is effective for stampers for a sample servo substrate, since the ion treatment decreases the fine roughness at or around the pits to improve remarkably the signal quality of servo pits in a sample servo system for obtaining tracking signals from pits.

Fourth Embodiment

In this Fourth Embodiment, the stamper prepared in the above second embodiment is etched by oxygen ions to remove the fine roughness still remaining after the ion treatment and the heat treatment from the surface or slant face of the hollow portion.

In the process of the present invention, the remaining roughness component after the ion treatment and heat treatment can be removed to adjust the fine roughness at or around the pits more completely. Therefore, the production process of the present invention is effective for stampers for sample servo substrates, since the ion treatment decreases the fine roughness at or around the pits to improve remarkably the signal quality of servo pits in a sample servo system for obtaining tracking signals from pits.

Fifth Embodiment

Application of the present invention to a domain wall displacement detection type of magneto-optical recording medium is described below.

Before detailed explanation, the domain wall displacement detection system is briefly explained by reference to FIGS. 9A to 9D. FIGS. 9A to 9D are schematic drawings for explaining the domain wall displacement detection type of magneto-optical recording medium.

Figure 9A:
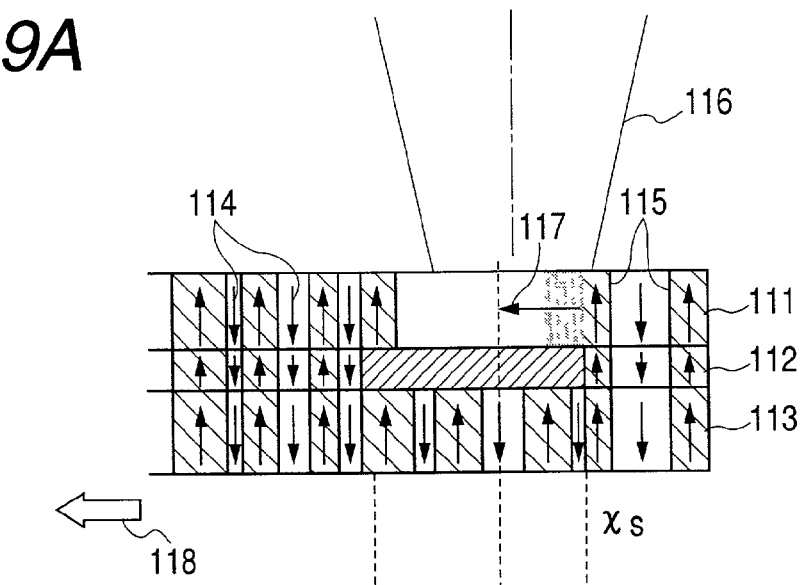
FIGS. 9A, 9B, 9C, and 9D show roughly a magneto-optical recording medium for a domain wall displacement detection system.

FIG. 9A is a schematic sectional view of a magneto-optical recording medium for the domain wall displacement detection system. This recording medium comprises first magnetic layer 111, second magnetic layer 112, and third magnetic layer 113 laminated successively in the named order. First magnetic layer 111 is constituted of a perpendicular-magnetized film which has a lower domain wall coercivity and higher domain wall mobility than those of third magnetic layer 113 at or around an ambient temperature. Second magnetic layer 112 is constituted of a magnetic layer having a lower Curie temperature than that of first magnetic layer 111 and third magnetic layer 113. Third magnetic layer 113 is constituted of a perpendicular-magnetized film. Arrows 114 in the drawing show orientation of atomic spins in the respective layers. domain wall 115 is formed at the boundary between the regions reversed in spin orientation direction. The numeral 116 denotes a light spot for read-out, and the numeral 118 denotes a movement direction of the recording medium relative to the light spot.

Figure 9B:
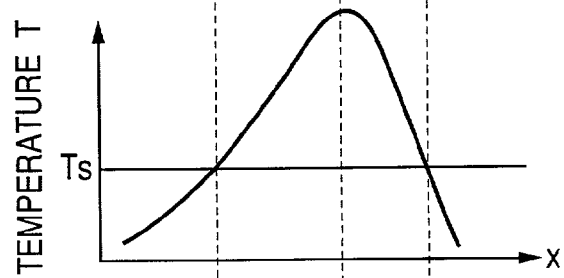

FIG. 9B is a graph showing temperature distribution on the magneto-optical recording medium. This temperature distribution is caused by the light spot projected for reproduction on the recording medium. The temperature comes to rise at the front side of the light spot, and the temperature peak is formed at the rear portion of the light spot. At the position Xs, the temperature of the medium reaches a temperature Ts near the Curie temperature of second magnetic layer 112.

Figure 9C:
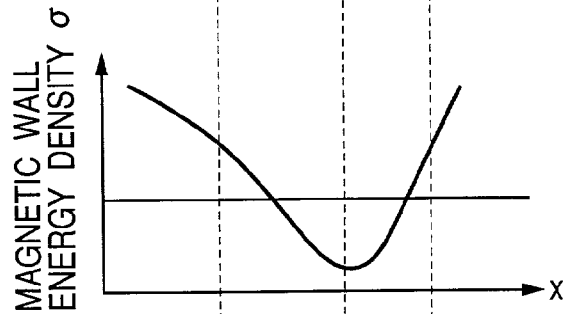
Figure 9D:
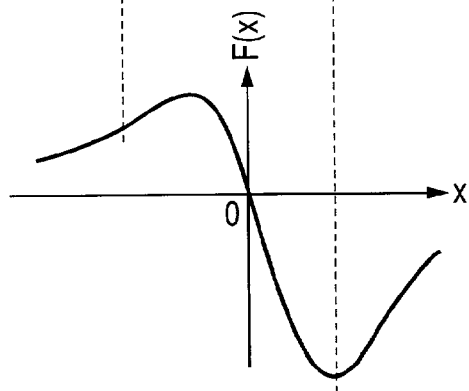

FIG. 9C shows the distribution of the domain wall energy σ1 corresponding to the temperature distribution in FIG. 9B. The gradient of the domain wall energy σ1 in the X direction will exert force $F1=\partial\sigma/\partial X$ on the domain walls in the respective layers at the position X as shown in FIG. 9D. This force F1 displaces the domain walls toward the lower domain wall energy side. In first magnetic layer 111, the domain wall which is isolated can readily be displaced by this force F1, since the layer has low domain wall coercivity and exhibits higher domain wall mobility. However, in the region before the position Xs (right side in the drawings), the temperature of the medium is still lower than Ts, so that first magnetic layer 111 is exchange-coupled with third magnetic layer 113 having a higher domain wall coercivity to fix the domain walls of the first magnetic layer at the positions corresponding to the positions of the domain walls of third magnetic field 113.

In the domain wall displacement detection system, as shown in FIG. 9A, at the position Xs, the temperature of the medium is elevated to a temperature Ts near the Curie temperature of second magnetic layer 112, whereby the exchange-coupling between first magnetic layer 111 and third magnetic layer 113 is broken. Consequently, domain wall 115 in the first magnetic layer is displaced "instantaneously" toward the region having a higher temperature and a lower domain wall energy density, as shown by broken arrow 117. This domain wall displacement is known to be caused more smoothly in the case where the adjacent recording tracks are magnetically isolated (magnetically not coupled).

By passage of domain wall 115 under reproducing light spot 116, all the atomic spins of first magnetic layer 111 are oriented uniformly in one and the same direction. Every time when domain walls 115 reaches the position Xs with the movement of the medium, domain wall 115 is displaced instantaneously to make the atomic spin orientation uniform by spin reversal with in the light spot. Consequently, the amplitude of the reproduced signals is kept constant and maximum, invariably independently of the interspace of the domain walls of the record (i.e., record mark length), whereby waveform interference and other disadvantageous phenomenon caused by optical diffraction limit are prevented. The occurrence of the domain wall displacement can be detected by a conventional magneto-optical head by rotation of polarization plane of the reproducing laser beam resulting from the magnetization reversal in the domain wall displacement region.

It is known that magnetic domains recorded at intervals of 0.1 μm on a magneto-optical recording medium of such a constitution can be reproduced with a usual optical head (light spot diameter: about 1 μm) at a wavelength $\lambda=680$ nm, NA=0.55, and the C/N ratio of about 40 dB by domain wall displacement detection system.

Figure 11:
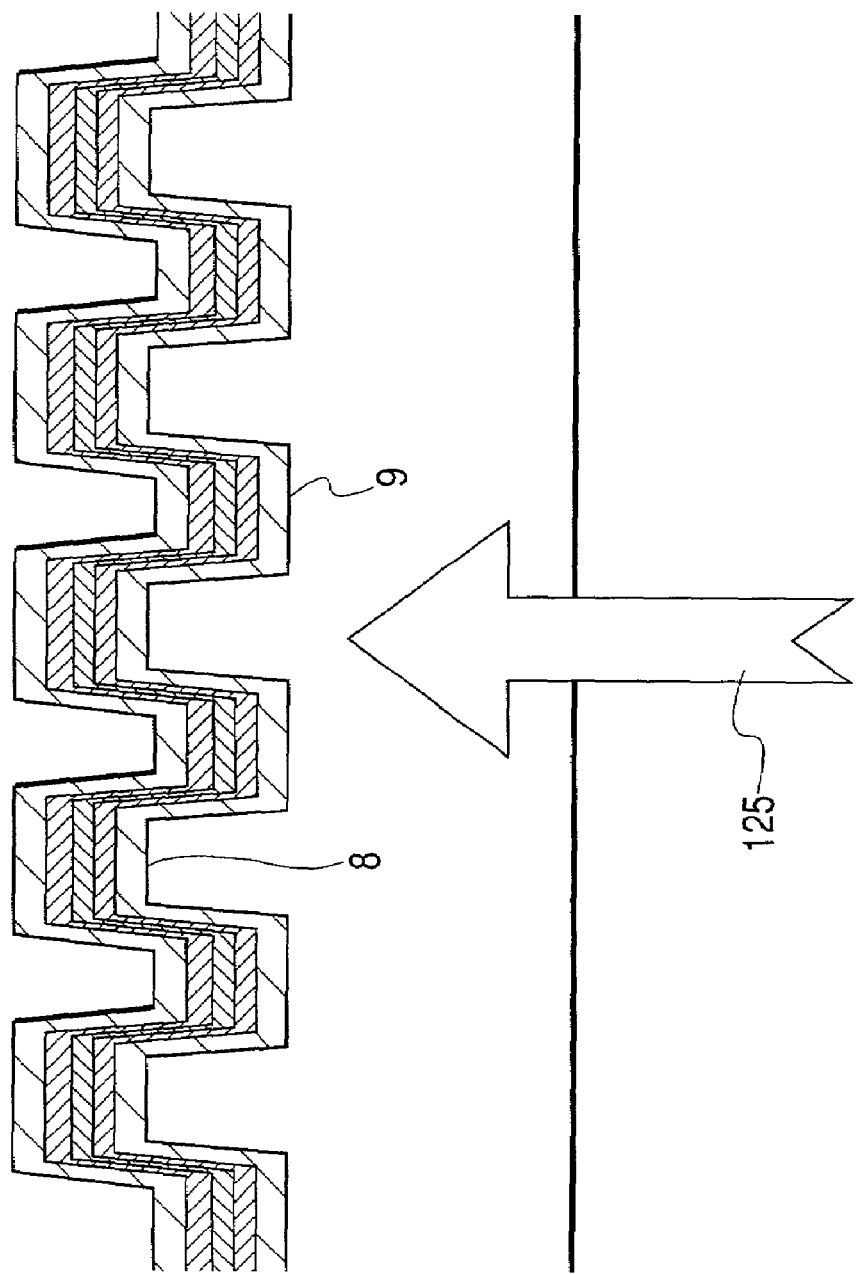
FIG. 11 is a schematic drawing illustrating land portions and groove portions of a magneto-optical recording medium of a domain wall displacement detection system.

FIG. 11 shows a magneto-optical recording medium formed in layers on a land-groove substrate for the aforementioned domain wall displacement detection. Recording track 8 distant from the source of light beam 125 is called a land portion, and recording track 9 near to the source of the light beam 125 is called a groove portion. In land-groove recording, recording and reproducing on the land track is conducted by utilizing the grove portion as the tracking guide, and recording and reproducing on the groove track is conducted by utilizing the land portion as the tracking guide. Thereby, the record can be made on the adjacent land portion as well as the groove portion. Thereby, recording density in the track direction is improved effectively.

As described above, the recording density in the track direction can be improved by the domain wall displacement detection system. By combining this technique with the land-groove recording method, the plane recording density can be improved greatly in comparison with conventional magneto-optical recording.

Further, for facilitating the domain displacement in the land portion and the groove portion, a so-called deep-groove substrate having a steep taper portion as shown in FIGS. 3A to 3L is effective (see Japanese Patent Application Laid-Open No. 9-161321). Formation of the magnetic films with high orientation on this substrate enables prevention of deposition of magnetic film on the taper portion (i.e., the side wall between the land and the groove) can be prevented practically. Thereby, magnetic domains can be formed in substantial absence of magnetic domains on the side wall for the land portion and the groove portion to isolate the tracks magnetically to facilitate domain displacement. The level difference between land track 8 and groove track 9 (the height difference between the surface of land track 8 and the surface of groove track 9) is preferably larger than the total film thickness of the magnetic layers (80 nm in Examples), ranging from 80 nm to 300 nm. That is, the depth of the groove provided on the disk substrate is preferably in the range from 80 nm to 300 nm. Further, the depth of the groove provided on the disk substrate is preferably any of $\lambda/3n$, $2\lambda/3n$, and $5\lambda/6$, where the symbol $\lambda$ represents the wavelength of the reproducing light beam for the magneto-optical disk, and the symbol n represents the refractivity of the substrate.

Furthermore, prevention of deposition of a magnetic film on the side wall is also effective for retarding thermal interference to the adjacent track to improve cross-erasing resistance. Simultaneously, in the domain wall displacement detection system, cross-talk from the adjacent track in reproduction can be reduced, because the temperature rise of the adjacent track to the domain wall displacement-initiation temperature Ts or higher can be avoided in reproduction. Thereby in the magnetic domain adjacent to the recorded track, usual magneto-optical reproduction can be conducted without causing domain wall displacement, and without causing significant cross talk by adjusting the record mark length to be less than the resolving power.

The combination of the deep-groove substrate and the domain wall displacement detection system can improve the plane recording density dramatically owing to synergistic effects of the aforementioned magnetic isolation of the tracks, improvement of cross-erasing resistance, and prevention of the cross talk (see Shiratori: Nippon Ohyo Jiki Gakkai-shi (Journal of the Magnetic Society of Japan), Vol. 23, No. 2, 1999, pp. 764 to 769 (Increase of recording density of magneto-optical recording medium by domain displacement detection system)).

FIG. 16 illustrates a layer structure of a substrate for groove-recording for a magneto-optical recording medium. In the groove-recording substrate, the groove face (hollow bottom face) as the recording track has a surface shape transferred from the glass face of the optical disk master. Accordingly, as explained in the above First Embodiment, a magneto-optical recording medium for domain displacement detection with low noise and high signal quality can be produced by use of a substrate having low surface roughness of the groove face produced by use of the optical disk stamper of the present invention. With such groove-recording substrate, the level difference between land track 8 and groove track 9 is preferably larger than the total film thickness of the magnetic layers (80 nm in Examples), ranging from 80 nm to 300 nm. Thereby, magnetic domains can be formed in substantial absence of magnetic domains on the side wall, similarly as in the land-groove substrate, to isolate the tracks magnetically and to facilitate domain displacement. Furthermore, the grooves as the recording tracks can be isolated magnetically by irradiating the land portions with a high-power laser light to deteriorate the magnetization of the land portions. This enables decrease of the level difference between land track 8 and groove track 9, in the range from 20 nm to 300 nm.

The present invention is described below specifically by reference to Examples without limiting the invention in any way.

COMPARATIVE EXAMPLE

A stamper for forming an optical disk substrate as the comparison standard for the present invention was prepared according to a conventional method. The surface state was evaluated by use of a scanning electron microscope (SEM-4000, Hitachi, Ltd.).

FIGS. 1A to 1G show a conventional process for producing a stamper for a land-groove recording substrate as a comparative example for the present invention.

Master glass 1 of 200 mm diameter and 6 mm thick having been polished to a surface roughness Ra of 5 nm or less was provided, and was washed sufficiently. This master glass 1 was spin-coated with HMDS (a silane coupling agent) as ground treatment. Thereon, a positive photoresist 2 (TSMR-8900, Tokyo Ohka Kogyo Co.) was applied by spin coating in a photoresist film thickness of 180 nm. The silane coupling agent is not limited to the HMDS used above. The master glass 1, after prebaking, was irradiated with light beam 3 in a zone ranging from 24 mm to 40 mm in diameter by means of a light exposure system having an Ar ion laser as the light source. The light exposure was conducted intermittently by changing the laser power corresponding to the radial position of the master glass so as to obtain a zone having a track pitch of 1.2 μm, and a land width and a groove width of 0.6 μm after development. In the light exposure, the rotation speed of the master glass was 900 rpm, and the spot diameter of the laser light was about 0.45 μm. The Ar ion laser was employed in this Comparative Example as the light source, but is not specially limited thereto. Other exposure system employing He—Cd ion laser, electron beam, ultraviolet light, or the like are also useful.

Thereafter, the exposed master glass was washed by spinning with a developing solution composed of a mixture of an inorganic alkali solution (AZ developer: Hoechst Co.) and ultrapure water in a mixing mass ratio of 1:2 under development conditions: time of preliminary washing with pure water, 600 seconds; developing time, 30 seconds; time of post-washing with pure water, 900 seconds; and time of spin drying, 60 seconds. Then, the master glass was post-baked at 90° C. for 30 minutes in a clean oven. On the surface of the master glass 1, electroconductive nickel film 6 was formed in a thickness of 100 nm by sputtering. The method of formation of the electroconductive nickel film is not limited to sputtering, but may be formed by nonelectrolytic plating, vacuum vapor deposition, or a like method.

On this electroconductive nickel film 6, electroformed nickel layer 15 was formed by electroformation in a thickness of 0.3 mm. Then electroconductive nickel layer 15 was peeled from master glass 1, spin-coated with a protection coating film, and punched by a press-punching machine.

After peeling the protection coating film, the electroformed nickel layer 15 separated was treated for plasma ashing in an oxygen plasma ashing apparatus (RH-20, Nichiden Anerba) by evacuating to a vacuum degree of $4\times10^{-3}$ Pa and introducing oxygen gas to remove the remaining photoresist, under the conditions: gas flow rate, 80 sccm; gas pressure, 80 Pa; RF power, 100 W; electrode distance, 60 mm; and etching time, 30 seconds. Thus a metal stamper 7 was prepared.

By use of this metal stamper, a land-groove recording substrate of 86.0 mm diameter was prepared.

On this substrate, the magneto-optical recording medium for the above-explained domain wall displacement detection method was prepared through the steps described below.

Figure 10:
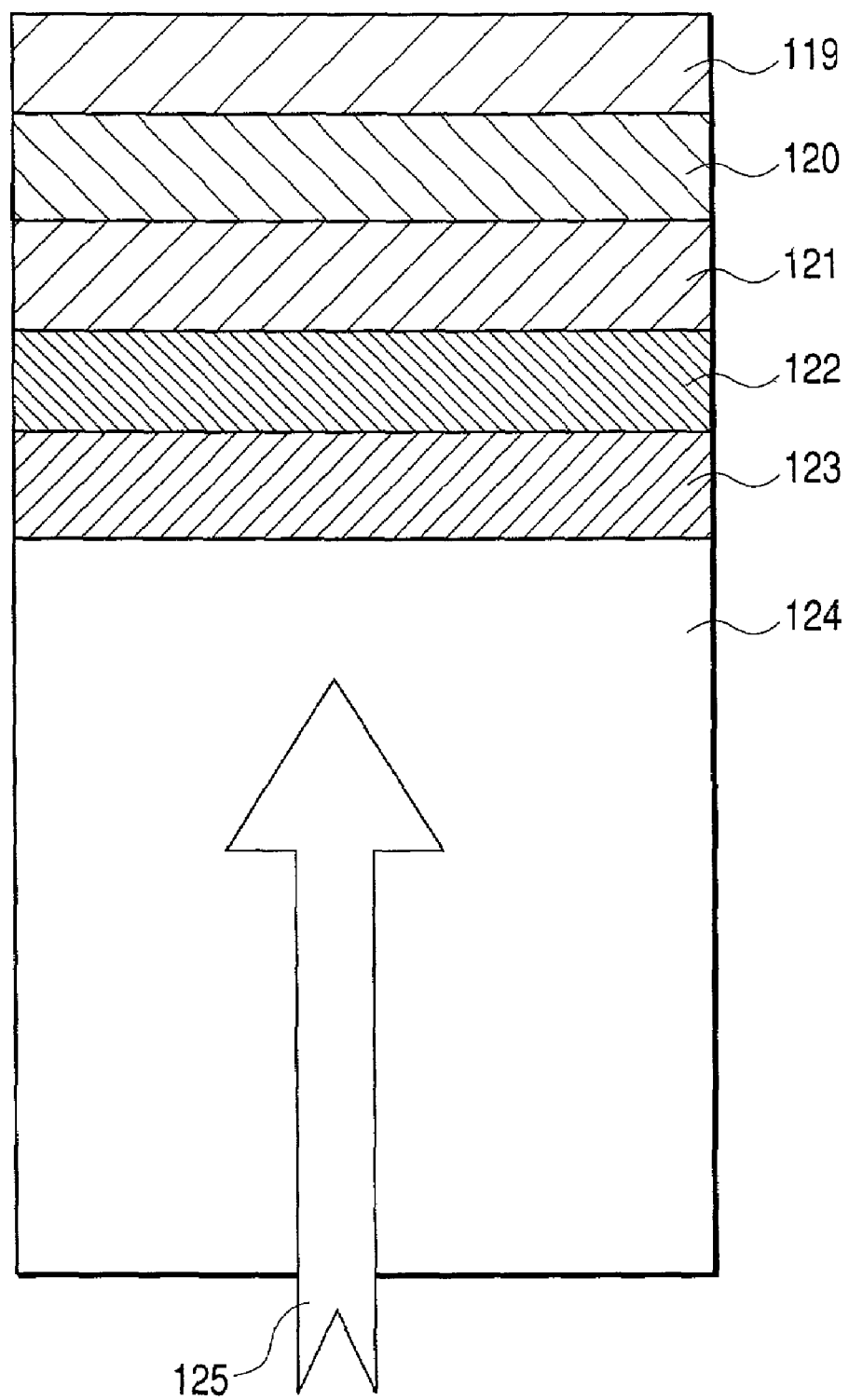
FIG. 10 is a schematic sectional view illustrating a layer constitution of a magneto-optical recording medium of a domain wall displacement detection system.

FIG. 10 is a schematic sectional view illustrating a layer constitution of the prepared magneto-optical recording medium. As shown in FIG. 10, dielectric layer 123, first magnetic layer 122, second magnetic layer 121, third magnetic layer 120, and dielectric layer 119 were laminated successively on transparent substrate 124. Arrow 125 indicates the direction of projection of the light beam for record reproduction. Transparent substrate 124 was made of polycarbonate. Dielectric layer 123 was formed from $Si_3N_4$. The $Si_3N_4$ layer was formed in Ar atmosphere with $N_2$ gas added by DC reactive sputtering in a layer thickness of 80 nm.

Subsequently, were formed successively a GdCo layer of 30 nm thick as the first magnetic layer, a DyFe layer of 10 nm thick as the second magnetic layer, and a TbFeCo layer of 80 nm thick as the third magnetic layer. The respective magnetic layers were formed by applying a DC power to targets of Gd, Dy, Tb, Fe, and Co by continuous sputtering with a magnetron sputtering apparatus. The magnetic layers are exchange-coupled with each other owing to successive layer formation without breaking the vacuum. Finally, an $Si_3N_4$ layer of 80 nm thick was formed as the dielectric (protecting) layer 119. The compositions of the magnetic layers were all adjusted to be near the compensation composition. The Curie temperatures were adjusted to 210° C. or higher for the first magnetic layer, 120° C. for the second magnetic layer, and about 290° C. for the third magnetic layer.

Figure 14:
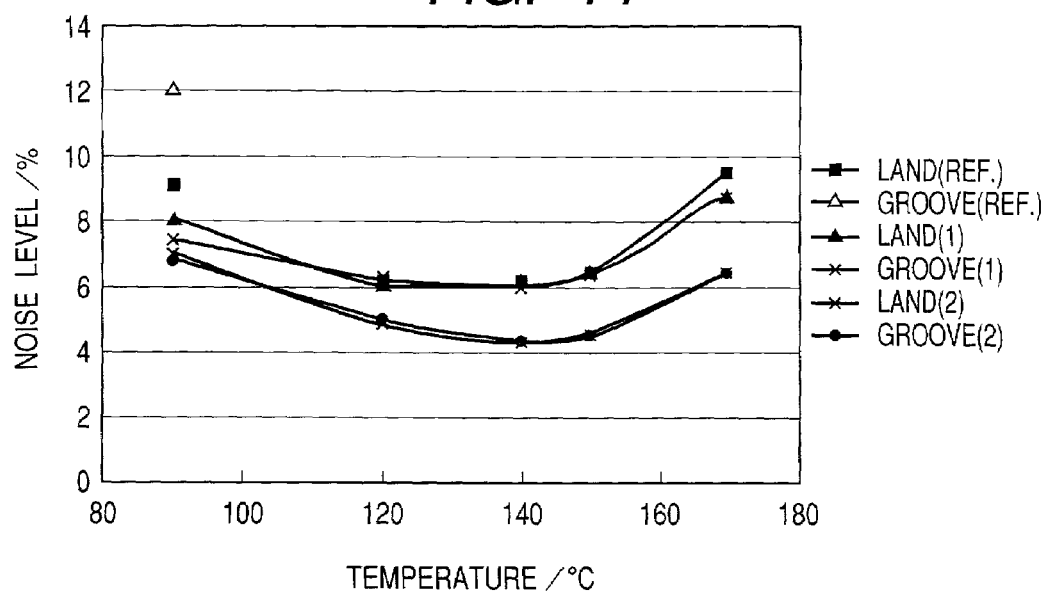
FIG. 14 is a graph showing dependency of the signal quality on the baking temperature in Examples 1 and 2.
Figure 15:
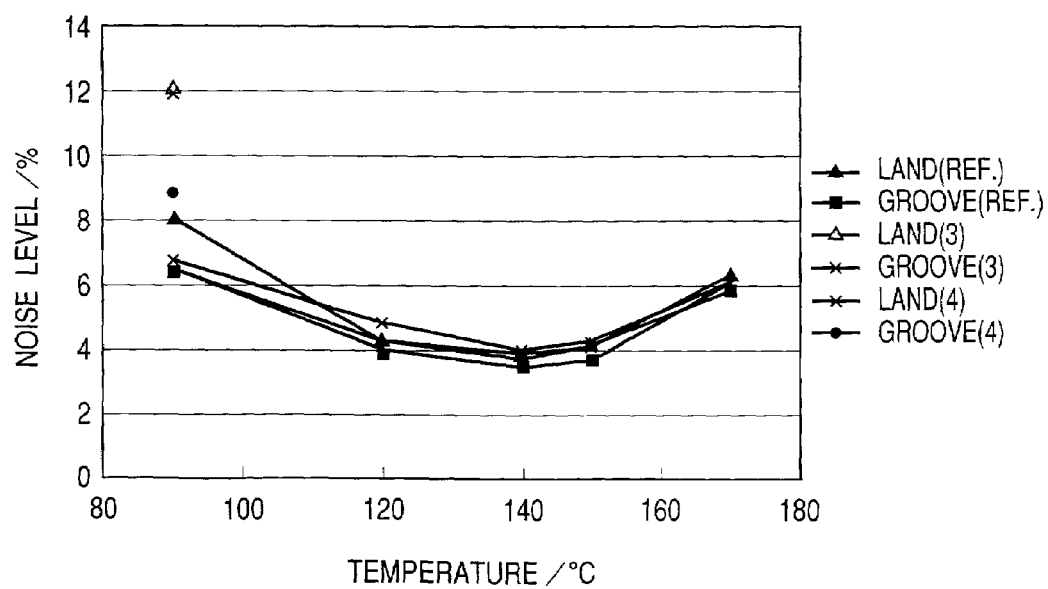
FIG. 15 is a graph showing dependency of the signal quality on the baking temperature in Examples 3 and 4.

After the lamination layer formation, a hard coat was formed on the layer surface from an ultraviolet-curing resin (INC-118, Nippon Kayaku K. K.). The ultraviolet-curing resin is not specially limited thereto. The prepared optical disk was tested by means of a driving apparatus at a wavelength of 680 nm and object lens NA of 0.6. In the test, the noise levels of the land portion and the groove portion were measured by introducing the reflecting light quantity signals from the laminated film into an oscilloscope. The measurement zone was selected in which the width of the land portion and the width of the groove portion are equal dimensionally to each other. As the results, the noise levels were, at the land, 0.2v (AC component of reflection light quantity signal)/2.2v (DC component of reflection light quantity signal)=9%; and at the groove, 0.3v/2.5v=12%. The results are shown in FIGS. 14 and 15 as denoted by a symbol "(ref)".

The formed substrate was found to have wrinkling roughness of tens of nanometers at the land shoulder portion according to observation with a scanning electron microscopy.

EXAMPLE 1

FIGS. 12A to 12I show a process of the present invention for producing a stamper for a land-groove recording substrate.

The metal stamper was prepared in a similar manner as in Comparative Example. However, after conducting all of application of photoresist 2 (FIG. 12A), light exposure (FIG. 12B), and development (FIG. 12C), master glass 1 was subjected to plasma ashing treatment 16 in a oxygen plasma ashing system to etch 10 nm of the photoresist layer thickness by evacuating to a vacuum degree of $4 \times 10^{-3}$ Pa and introducing oxygen gas therein under the conditions: gas flow rate, 80 sccm; gas pressure, 8.0 Pa; Rf power, 100 W; electrode distance, 150 mm; and etching time, 20 seconds. The thickness of photoresist 2 applied initially onto master glass 1 was adjusted to 190 nm in consideration of the thickness decrease in the oxygen plasma ashing treatment 16. After the oxygen plasma ashing treatment 16, the plural masters were baked respectively under baking conditions of 90° C., 120° C., 140° C., 150° C., and 170° C. in a clean oven.

Figure 12A:
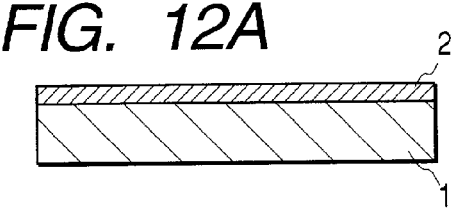
FIGS. 12A, 12B, 12C, 12D, 12E, 12F, 12G, 12H, and 12I show the process for producing the stamper for optical disk substrates in Examples 1 and 2.
Figure 12B:
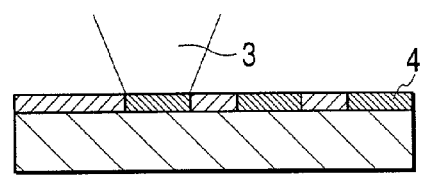
Figure 12C:
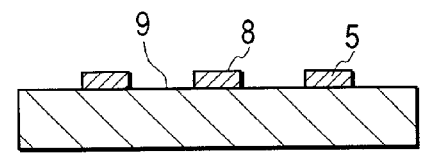
Figure 12D:
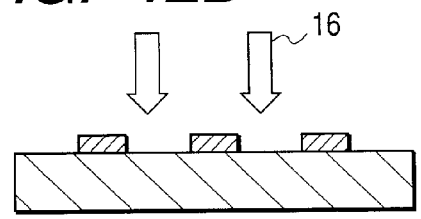
Figure 12E:
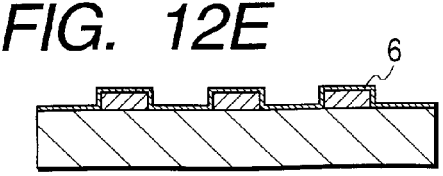
Figure 12F:
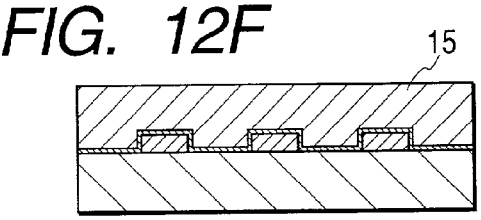
Figure 12G:
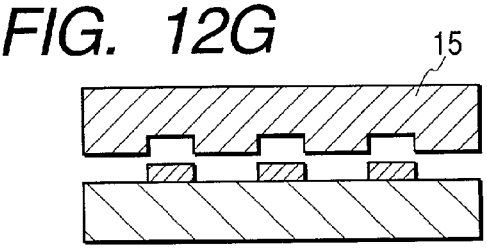
Figure 12H:
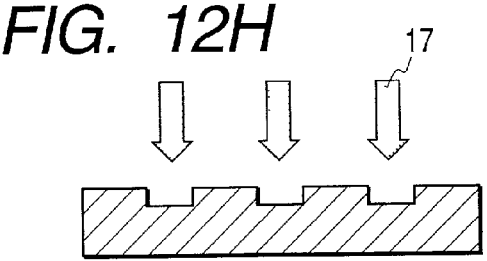

Thereafter, as shown in FIG. 12E, electroconductive nickel film 6 was formed on master glass 1 by sputtering. On the electroconductive film 6, electroformed nickel layer 15 was formed by electroformation of nickel as shown in FIG. 12F. This electroformed nickel layer 15 was peeled from master glass 1 as shown in FIG. 12G, and subjected to Ar plasma etching treatment 17 as shown in FIG. 12H. The Ar plasma etching was conducted in an oxygen plasma ashing system with introduction Ar through an independent piping system under the conditions: gas flow rate, 50 sccm; gas pressure, 5.0 Pa; RF power, 150 W; electrode distance, 150 mm; and etching time, 8.0 minutes, to etch 10 nm thick of the surface of the separated electroformed layer 15.

Figure 12I:
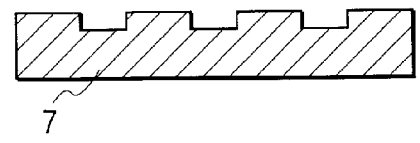

Thus stamper 7 is completed (FIG. 12I). With this stamper 7, a land-groove recording substrate of 86.0 diameter was prepared by a 2P process.

On the surface of this substrate, layers for magneto-optical recording medium of domain wall displacement detection system similarly as in Comparative Example.

The optical disks thus prepared were tested in the same manner as in Comparative Example. The dependency of the noise levels is shown in FIG. 14.

As the results, the lowest noise level was 0.1v/2.3v=4.3% for the land, and 0.15v/2.5v=6% for the groove. The results are shown by the lines denoted by the symbol (1). The combination of a domain displacement detection type of magneto-optical recording medium with the deep-groove substrate of groove depth 180 nm of the present invention improved the S/N of the signals, decreasing the wrinkling roughness of tens of nanometers at the shoulder of the land, enabling smooth displacement of domain walls in the land portion, and reducing greatly the signal jitter in signal reproduction.

EXAMPLE 2

A stamper was prepared in the same manner as in Example 1 except that master glass 1 was subjected to a baking treatment 18 before master glass is placed in the oxygen plasma ashing apparatus. The baking conditions were the same as in Example 1. After that, electroconductive nickel film 6 was formed by sputtering on master glass 1. On electroconductive film 6, nickel was electroformed to obtain electroformed nickel layer 15. This electroformed nickel layer 15 was peeled from master glass 1, and was subjected to Ar etching 17 in the same manner as in Example 1 to complete stamper 7.

With this stamper 7, a land-groove recording substrate of 86.0 diameter was prepared by a 2P process.

An optical disk was prepared by forming the layers in the same manner as in Example 1, and was tested in the same manner as in Example 1.

As the results, the lowest noise level was 0.1v/2.3v=4.3% for the land, and 0.15v/2.5v=6% for the groove. The results are shown in FIG. 14 by the lines denoted by the symbol (2). The signal jitter in signal reproduction was remarkably improved similarly as in Example 1.

EXAMPLE 3

Figure 13A:
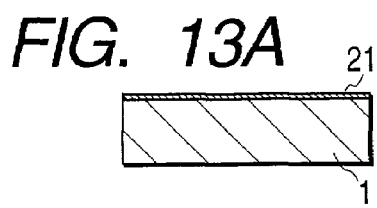
FIGS. 13A, 13B, 13C, 13D, 13E, 13F, 13G, 13H, 13I, 13J, 13K, 13L, 13M and 13N show the process for producing the stamper for optical disk substrates in Examples 3 and 4.
Figure 13B:
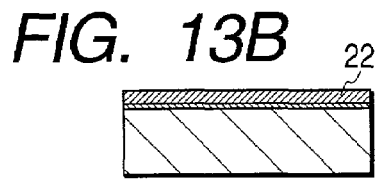
Figure 13C:
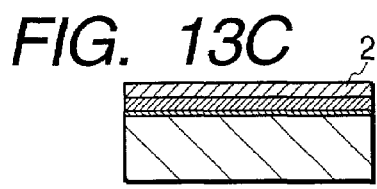
Figure 13D:
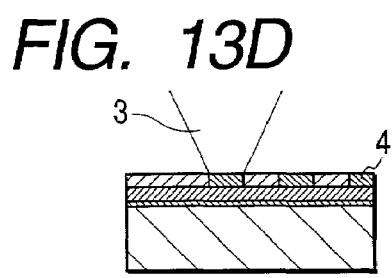
Figure 13E:
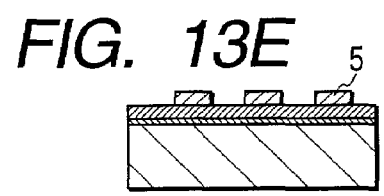
Figure 13F:
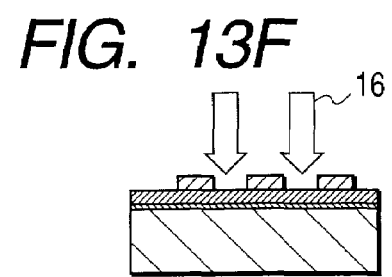
Figure 13G:
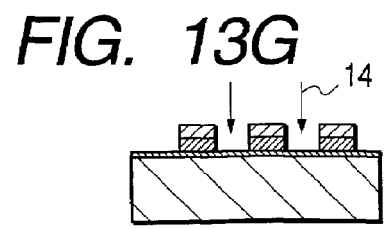
Figure 13H:
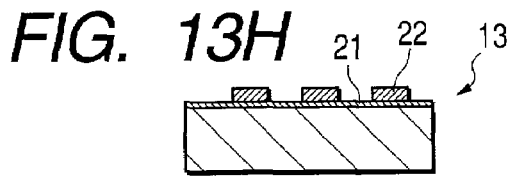
Figure 13I:
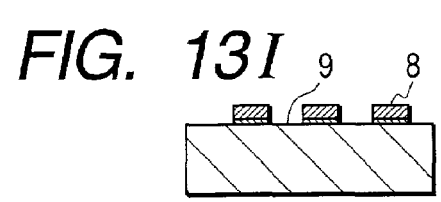
Figure 13J:
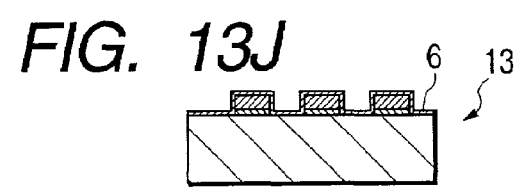
Figure 13K:
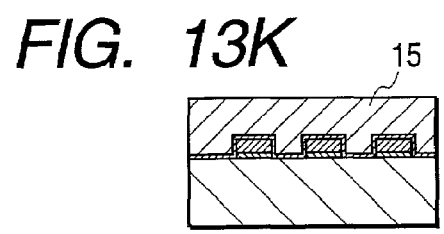
Figure 13L:
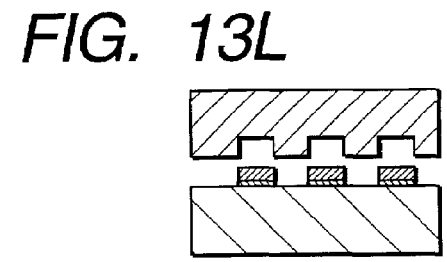
Figure 13M:
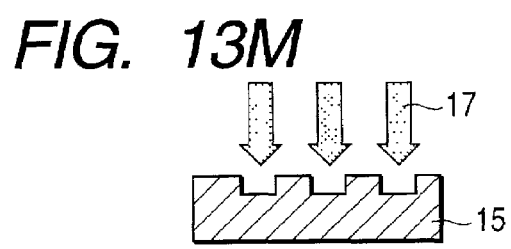
Figure 13N:
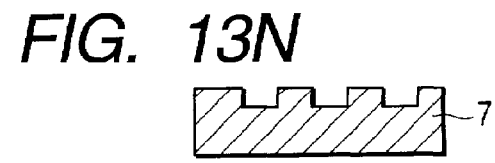

FIGS. 13A to 13N show a process of the present invention for producing a stamper for a land-groove recording substrate.

On the surface of a master glass 1 of 200 mm outside diameter and 6 mm thick, polished at the backside to surface roughness of not more than 5 nm, $Al_2O_3$ layer 21 was formed in a thickness of 20 nm as the first thin layer as shown in FIG. 13A. Thereon, $SiO_2$ layer 22 was formed in a thickness of 160 nm as the second thin layer as shown in FIG. 13B. $SiO_2$ layer 22 was spin-coated with a silane coupling agent for underlayer treatment, and thereon, positive photoresist 2 was spin-coated similarly in a layer thickness of 100 nm as shown in FIG. 13C. Photoresist 2 on master glass 1 was exposed to light beam 3 as shown in FIG.

13D, and the exposed portion 4 was removed by development as shown in FIG. 13E. Then, master glass 1 was placed in an oxygen plasma ashing apparatus, and plasma ashing was conducted with introduction of oxygen under the same conditions as in Example 1 as shown in FIG. 13F. Further a baking treatment was conducted under the same conditions as in Example 1. The bared $SiO_2$ layer face was etched by reactive ion etching 14 to prepare glass master 13 having grooves of 160 nm deep as shown in FIG. 13G. This example is explained by employing the reactive ion etching (RIE), but the dry etching method is not limited thereto. Any dry etching method capable of anisotropic etching may be employed, including sputter etching (SE), reactive ion beam etching (RIBE), and sputter ion beam etching(SIBE). Master glass 1 was placed in a chamber of a reactive ion etching apparatus. The chamber was evacuated to a vacuum degree of $1\times10^{-4}$ Pa. $SiO_2$ layer 22 was etched by reactive ion etching 14 under the conditions: gas flow rate, 6 sccm; gas pressure, 0.3 Pa; and RF power, 100 W. Thereby, the etching rate was about 200 Å/min. The $CHF_3$ gas etches $SiO_2$ layer 22, but is much less reactive to $Al_2O_3$ and etches little $Al_2O_3$ (etching selectivity ratio $Al_2O_3:SiO_2=1:20-30$ approximately). Therefore the etching is stopped automatically when $Al_2O_3$ comes to be bared without strict control of the etching time. That is, $Al_2O_3$ layer 21 serves as a stopper layer. Therefore, by conducting the etching somewhat longer than the etching time calculated from the etching depth and the etching rate, the etching can be achieved invariably at a prescribed groove depth with less variation, even with slight variation of the etching atmosphere and other conditions in the etching chamber. In this Example, $CHF_3$ was used as the etching gas. $CF_4$ gas may added thereto. Otherwise, $CF_4$ gas could be used by addition of hydrogen with satisfactory results.

Photoresist 5 remaining on glass master 13 was removed by dissolution with acetone, and by oxygen plasma ashing as shown in FIG. 13H. Thereafter, unnecessary $Al_2O_3$ layer 21 was removed by wet etching with an inorganic alkali solution (AZ Developer: Hoechst Co.) by immersion for 9 minutes 30 seconds in the alkali solution as shown in FIG. 13I. Then on glass master 13, electroconductive nickel film 6 was formed by sputtering in a thickness of 100 nm as shown in FIG. 13J, and nickel was electroformed as shown in FIG. 13K. The electroformed nickel layer 15 was peeled from the glass master as shown in FIG. 13L. Further, the surface of the obtained electroformed nickel layer 15 was subjected to Ar etching under the same conditions as in Example 1 as shown in FIG. 13M to complete stamper 7 as shown in FIG. 13N. With this stamper 7, a land-groove recording medium of 86.0 mm diameter was prepared by a 2P process.

On the surface of this substrate, lamination layer was formed in the same manner as in Comparative Example, and on the surface of this layer, a hard coat was formed from an ultraviolet-curing resin. The obtained optical disk was tested in the same manner as in Comparative Example. The dependency of the noise level on the temperature are shown in FIG. 15 by the lines denoted by the symbol (3). As the results, the lowest noise level was 0.08v/2.3v=3.5% for the land, and 0.1v/2.5v=4% for the groove. The signal jitter in signal reproduction was remarkably improved similarly as in Example 1.

EXAMPLE 4

A stamper was prepared in a similar manner as in Example 3. In this Example, after the light exposure and development of master glass 1, the baking treatment was conducted under the same conditions as in Example 2. The treated master glass was placed in an oxygen plasma ashing apparatus, and plasma ashing treatment 16 was conducted with introduction of oxygen under the same conditions as in Example 1. The face of bared thin $SiO_2$ layer 21 was etched by reactive ion etching 14 in the same manner as in Example 3 to obtain glass master 13 having grooves of 160 nm deep. Electroformed nickel layer 15 was formed in the same manner as in Example 3. The surface of obtained electroformed nickel layer 15 was subjected to Ar etching treatment under the same conditions as in Example 1. With stamper 7 prepared thus, a land-groove recording substrate of 86.0 mm diameter was prepared by a 2P method.

On the optical disk prepared with this stamper 7, layers were formed in the same manner as in Example 1. As the results, the lowest noise level was 0.08v/2.3v=3.6% for the land, and 0.1v/2.5v=3.9% for the groove (shown in FIG. 15 by the lines denoted by the symbol (4)). The signal jitter in signal reproduction was remarkably improved similarly as in Example 1.

In the above Examples, the land-groove substrate used had grooves of about 160 nm deep. However, with the groove recording substrate as shown in FIG. 16, the same or more favorable results could be achieved. By lowering the magnetization of the land portion by high-power laser beam projection to isolate magnetically the grooves serving as the recording tracks, the groove depth in the range from 20 nm to 300 nm was applicable.

What is claimed is:

1. A process for producing an optical disk master, comprising the steps of:
    forming a photoresist layer on a glass master,
    cutting the photoresist layer by projecting light beam onto the glass master having the photoresist layer thereon to expose the photoresist layer to light;
    developing the photoresist layer after the cutting step to form a hollow portion corresponding to the light-exposed portion;
    carrying out an ion treatment by projecting ions onto the developed photoresist layer to decrease a surface roughness of the glass master and the developed photoresist layer and heat-treating the photoresist layer at a temperature no less than 30° below the melting point to less than the melting point thereof, after the ion treatment step to provide a surface roughness Ra of the developed photoresist layer of not more than 1 nm.

2. The process according to claim 1, wherein the optical disk master corresponds to a groove-recording optical disk.

3. The process according to claim 1, wherein the glass master is made of quartz glass, and the process further comprises the step of forming a fine pattern on the glass master by projecting ions onto the developed photoresist layer, and etching the quartz glass by reactive ion etching with a CHF type gas by utilizing the remaining photoresist as a mask.

4. The process according to claim 1, wherein the glass master is comprised of a glass plate coated with a thin inorganic oxide film, and the process further comprises the step of forming a fine pattern on the glass master by projecting ions onto the developed photoresist layer and etching the thin inorganic oxide film by reactive ion etching with a CHE type gas by utilizing the remaining photoresist as a mask.

5. The process according to claim 4, wherein the thin inorganic oxide film formed on the glass master is comprised of at least one layer made of a material different from the glass plate.

6. The process according to claim 5, wherein the thin inorganic oxide film has a lamination layer structure comprised of an $Al_2O_3$ film and an $SiO_2$ film, and the $SiO_2$ film is etched by utilizing the $Al_2O_3$ as an etching stopper layer.

7. The process according to claim 1, wherein the photoresist layer is etched by at least 5 nm in the ion treatment.

8. The process according to claim 1, wherein information recorded by cutting in the cutting step includes sample servo pits.

* * * * *

UNITED STATES PATENT AND TRADEMARK OFFICE
CERTIFICATE OF CORRECTION

| | | |
|---|---|---|
| PATENT NO. | : 7,101,656 B2 | Page 1 of 1 |
| APPLICATION NO. | : 10/107190 | |
| DATED | : September 5, 2006 | |
| INVENTOR(S) | : Masahito Konishi et al. | |

It is certified that error appears in the above-identified patent and that said Letters Patent is hereby corrected as shown below:

ON THE TITLE PAGE, ITEM (56)

Foreign Patent Documents, "JP 2001243665  *  9/2001" should read --JP    2001-243665  *  9/2001--.

COLUMN 5:

Line 65, "IF," should read --1F,--.

COLUMN 18:

Line 61, "CHE" should read --CHF--.

COLUMN 19:

Line 2, "CHE" should read --CHF--.

Signed and Sealed this

Fourth Day of September, 2007

JON W. DUDAS
*Director of the United States Patent and Trademark Office*